United States Patent
Nguyen

Patent Number: 6,092,195
Date of Patent: Jul. 18, 2000

[54] ENCRYPTION OF DEFECTS MAP

[75] Inventor: Vien N. Nguyen, San Jose, Calif.

[73] Assignee: Castlewood Systems, Inc., Pleasanton, Calif.

[21] Appl. No.: 08/970,340

[22] Filed: Nov. 14, 1997

[51] Int. Cl.[7] .................................................. G06F 12/14
[52] U.S. Cl. ................... 713/200; 714/8; 308/4
[58] Field of Search .............................. 380/4; 713/200; 714/8, 723

[56] References Cited

U.S. PATENT DOCUMENTS

| | | |
|---|---|---|
| 5,235,478 | 8/1993 | Hoshimi et al. . |
| 5,257,149 | 10/1993 | Meyer . |
| 5,271,018 | 12/1993 | Chan ......................................... 360/48 |
| 5,394,469 | 2/1995 | Nagel et al. .............................. 380/4 |
| 5,398,141 | 3/1995 | Tannert . |
| 5,442,638 | 8/1995 | Awad et al. ............................. 711/112 |
| 5,523,903 | 6/1996 | Hetzler et al. . |
| 5,535,072 | 7/1996 | Witt et al. . |
| 5,546,556 | 8/1996 | Matsushita ............................. 711/100 |
| 5,559,648 | 9/1996 | Hunter et al. . |
| 5,570,244 | 10/1996 | Wiselogel . |
| 5,579,189 | 11/1996 | Morehouse et al. . |
| 5,587,850 | 12/1996 | Ton-that . |
| 5,615,063 | 3/1997 | Kuroki et al. . |
| 5,636,075 | 6/1997 | Nishimura et al. . |
| 5,751,947 | 5/1998 | Arakawa ................................... 714/54 |
| 5,784,216 | 7/1998 | Zaharris .................................... 360/48 |
| 5,802,584 | 9/1998 | Kool et al. .............................. 711/154 |
| 5,812,335 | 9/1998 | Kool et al. ................................ 360/51 |
| 5,812,755 | 9/1998 | Kool et al. ................................. 714/8 |
| 5,835,930 | 11/1998 | Dobbek ....................................... 711/4 |
| 5,850,566 | 12/1998 | Solan et al. ................................ 710/5 |
| 5,892,900 | 4/1999 | Ginter et al. ............................ 713/200 |

Primary Examiner—Joseph E. Palys
Assistant Examiner—Nguyêñ Nguyên
Attorney, Agent, or Firm—Townsend and Townsend and Crew LLP

[57] ABSTRACT

A technique for authenticating a headerless-ID magnetic disk includes the steps of inserting the headerless-ID magnetic disk having a plurality of defective locations and an encrypted defect map into a removable drive unit, retrieving the encrypted defect map from the magnetic disk, storing the encrypted defect map into a memory in the removable drive unit, decrypting the encrypted defect map to form a defect map identifying the plurality of defective locations, and using the defect map in the memory to provide access to locations on the headerless-ID magnetic disk other than the plurality of defective locations.

18 Claims, 9 Drawing Sheets

ENCRYPTION OF DEFECTS MAP

BACKGROUND OF THE INVENTION

The present invention generally relates to removable storage devices for electronic information. More particular, the present invention relates to methods and apparatus for authentication data.

Consumer electronics including television sets, personal computers, and stereo or audio systems, have changed dramatically since their availability. Television was originally used as a stand alone unit in the early 1900's, but has now been integrated with audio equipment to provide video with high quality sound in stereo. For instance, a television set can have a high quality display coupled to an audio system with stereo or even "surround sound" or the like. This integration of television and audio equipment provides a user with a high quality video display for an action movie such as STARWARS™ with "life-like" sound from the high quality stereo or surround sound system. Accordingly, the clash between Luke Skywalker and Darth Vader can now be seen as well as heard in surround sound on your own home entertainment center. In the mid-1990's, computer-like functions became available on a conventional television set. Companies such as WebTV of California provide what is commonly termed as "Internet" access to a television set. The Internet is a world wide network of computers, which can now be accessed through a conventional television set at a user location. Numerous displays or "wet sites" exist on the Internet for viewing and even ordering goods and services at the convenience of home, where the act of indexing through websites is known as "surfing" the web. Accordingly, users of WebTV can surf the Internet or web using a home entertainment center.

Figure 1:
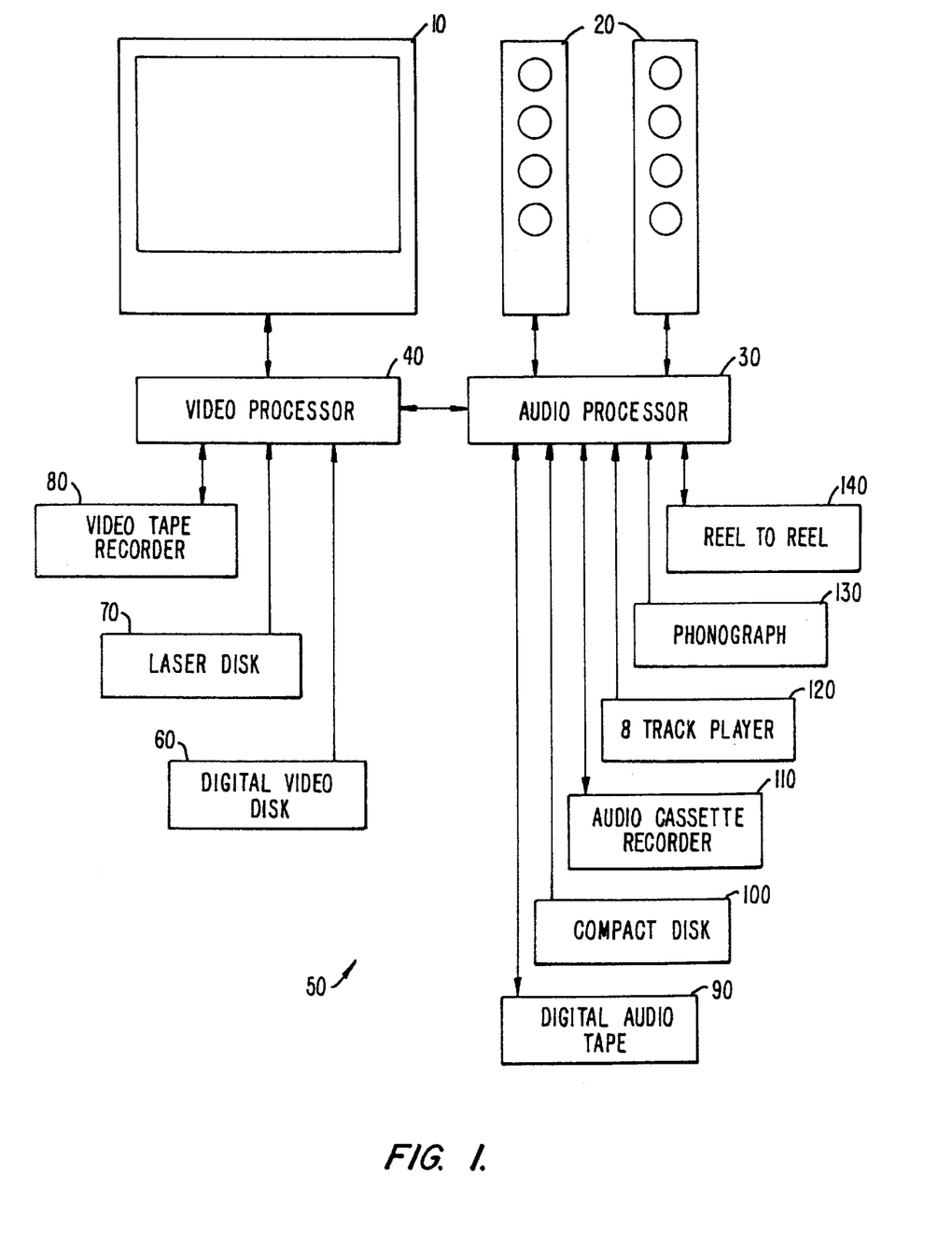
FIG. 1 illustrates a conventional audio and video configuration.

As merely an example, FIG. 1 illustrates a conventional audio and video configuration, commonly termed a home entertainment system, which can have Internet access. FIG. 1 is generally a typical home entertainment system, which includes a video display 10 (e.g., television set), an audio output 20, an audio processor 30, a video display processor 40, and a plurality of audio or video data sources 50. Consumers have often been eager to store and play back pre-recorded audio (e.g., songs, music) or video using a home entertainment system. Most recently, consumers would like to also store and retrieve information, commonly termed computer data, downloaded from the Internet.

Music or audio have been traditionally recorded on many types of systems using different types of media to provide audio signals to home entertainment systems. For example, these audio systems include a reel to reel system 140, using magnetic recording tape, an eight track player 120, which uses eight track tapes, a phonograph 130, which uses LP vinyl records, and an audio cassette recorder 110, which relies upon audio cassettes. Optical storage media also have been recognized as providing convenient and high quality audio play-back of music, for example. Optical storage media exclusively for sound include a digital audio tape 90 and a compact disk 10. Unfortunately, these audio systems generally do not have enough memory or capacity to store both video and audio to store movies or the like. Tapes also have not generally been used to efficiently store and retrieve information from a personal computer since tapes are extremely slow and cumbersome.

Audio and video have been recorded together for movies using a video tape or video cassette recorder, which relies upon tapes stored on cassettes. Video cassettes can be found at the local Blockbuster™ store, which often have numerous different movies to be viewed and enjoyed by the user. Unfortunately, these tapes are often too slow and clumsy to store and easily retrieve computer information from a personal computer. Additional video and audio media include a laser disk 70 and a digital video disk 60, which also suffer from being read only, and cannot be easily used to record a video at the user site. Furthermore, standards for a digital video disk have not been established of the filing date of this patent application and do not seem to be readily establishable in the future.

From the above, it is desirable to have a storage media that can be used for all types of information such as audio, video, and digital data, which have features such as a high storage capacity, expandability, and quick access capabilities.

The present invention relates to storage media that utilizes magneto-resistive head (MR read/write head) technology. One benefit to MR head technology is the reduction in amount of data overhead by removing ID fields from data sectors on the disk. Magnetic disks without such ID fields are termed "headerless ID" magnetic disks.

Reading and writing with MR read/write heads to headerless ID magnetic disks within removable cartridges provide unique challenges not fully appreciated or contemplated by fixed disk drive units. For example, while removable cartridges are typically meant to be removed from a removable drive unit and transported to different locations. In contrast fixed disk drive units are typically not meant to be separated from a computer system and are relative stationary because of the relative bulkiness and heaviness of the fixed disk drives.

One parameter that is always different from removable cartridge to removable cartridge is the location of defects on the magnetic disk.

Defect maps are well known maps that maintain the address of locations on the magnetic disk that are faulty. For fixed disk drives, defect maps are often burned into a ROM, however for removable cartridges, defect maps are often resident upon the magnetic disk. Some defect maps are even compressed in order to save space on the magnetic disk. Because the defect map is stored on the magnetic disk, when the removable cartridge is inserted into a removable drive unit, the defect map is read from the magnetic disk and is used to determine the locations of bad sections on the disk.

One particular difficult problem that becomes more apparent due to the increased mobility of removable cartridges is that the data contained therein are more prone to unauthorized duplication or forgery. Thus what is needed is a method and apparatus for inhibiting duplication and forgery of removable cartridges, and a way to authenticate removable cartridges.

SUMMARY OF THE INVENTION

According to the present invention, a technique including methods and a device for providing authentication of removable media. In an exemplary embodiment, the present invention provides a methods and apparatus for encryption of data on a removable media.

According to an embodiment, a method for authenticating a headerless-ID magnetic disk includes the steps of inserting the headerless-ID magnetic disk having a plurality of defective locations and an encrypted defect map into a removable drive unit, retrieving the encrypted defect map from the magnetic disk, and storing the encrypted defect map into a memory in the removable drive unit. The encrypted defect map is decrypted to form a defect map identifying the plurality of defective locations. The step of using the defect map in the memory to provide access to locations on the headerless-ID magnetic disk other than the plurality of defective locations is also performed.

Numerous benefits are achieved by way of the present invention. For instance, the present invention hinders the ability to duplicate a magnetic disk. Depending upon the embodiment, the present invention provides at least one of these if not all of these benefits and others, which are further described throughout the present specification.

Further understanding of the nature and advantages of the invention may be realized by reference to the remaining portions of the specification and drawings.

DESCRIPTION OF SPECIFIC EMBODIMENTS

System Overview

Figure 2:
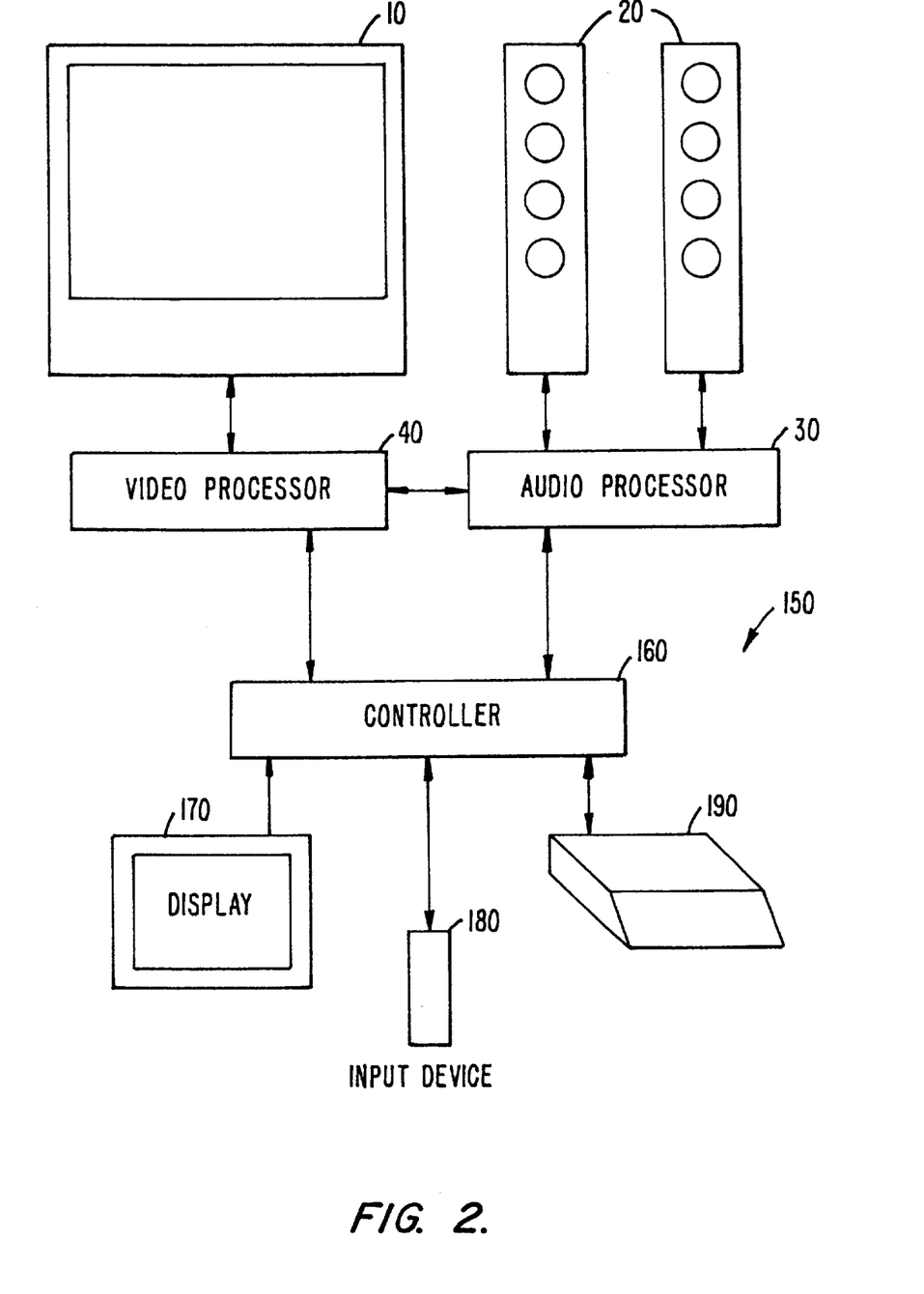
FIG. 2 illustrates a system according to an embodiment of the present invention.

FIG. 2 is a simplified block diagram of a system according to an embodiment of the present invention. This embodiment is merely an illustration and should not limit the scope of the claims herein. The system 150 includes the television display 10, which is capable of Internet access or the like, the audio output 20, a controller 160, a user input device 180, a novel storage unit 190 for storing and accessing data, and optionally a computer display 170. Output from system 150 is often audio and/or video data and/or data that is generally input into audio processor 30 and/or video processor 40.

Figure 5A:
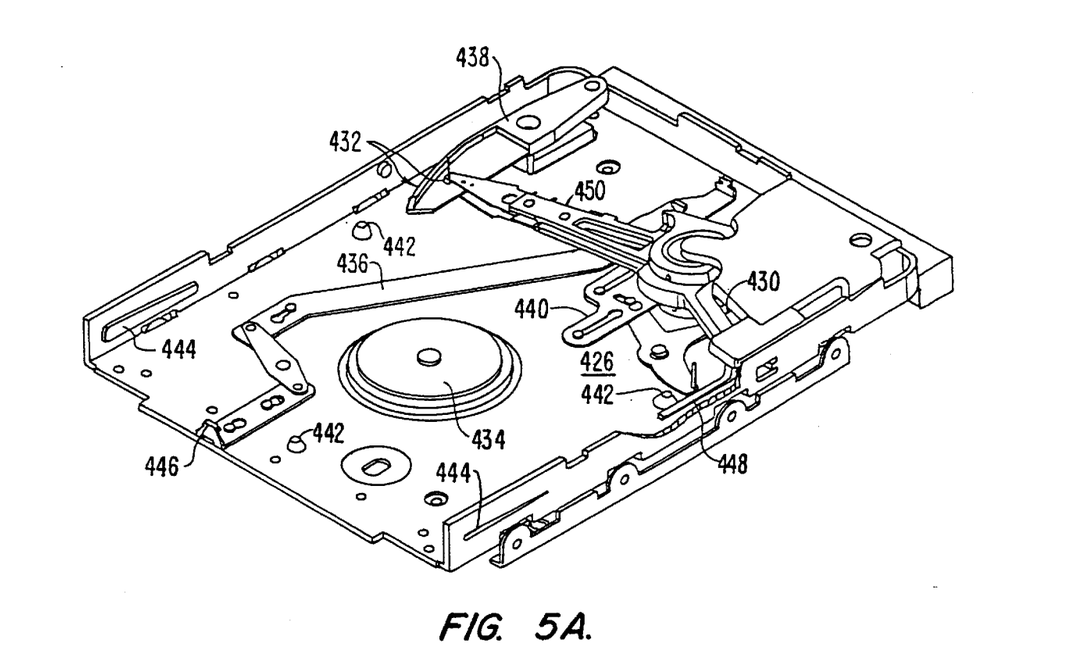
FIGS. 5A–5F illustrate simplified views and a storage unit for reading and/or writing from a removable media cartridge.
Figure 5B:
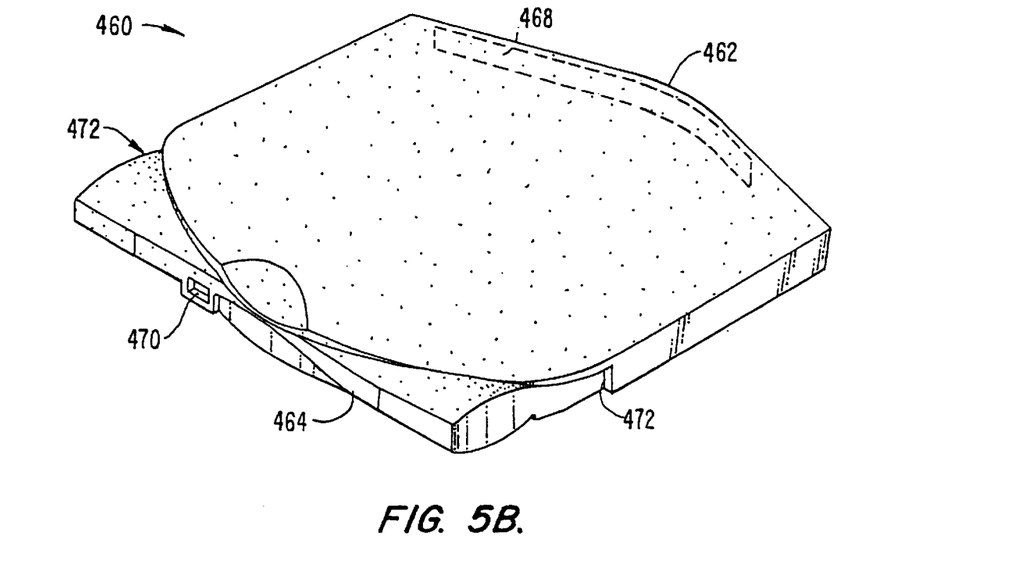
Figure 5C:
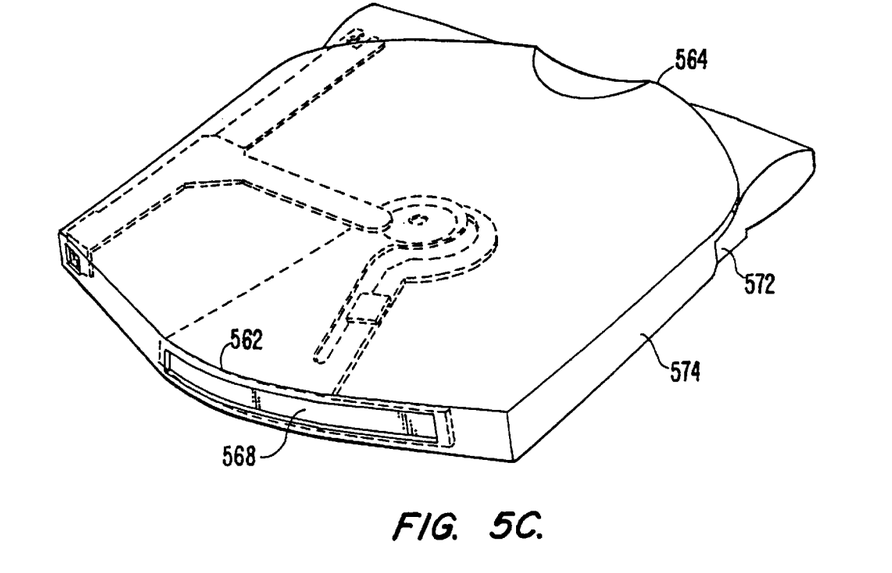

The storage unit includes a high capacity removable media cartridge, such as the one shown in FIGS. 5B & 5C, for example. The removable media cartridge can be used to record and playback information from a video, audio, or computer source. The cartridge is capable of storing at least 2 GB of data or information. The cartridge also has an efficient or fast access time of about 13 ms and less, which is quite useful in storing data for a computer. The cartridge is removable and storable. For example, the cartridge can store up to about 18 songs, which average about 4 minutes in length. Additionally, the cartridge can store at least 0.5 for MPEGII- 2 for MPEGI full length movies, which each runs about 2 hours. Furthermore, the cartridge can be easily removed and stored to archive numerous songs, movies, or data from the Internet or the like. Accordingly, the high capacity removable media provides a single unit to store information from the video, audio, or computer. Further details of the storage unit are provided below.

Figure 3:
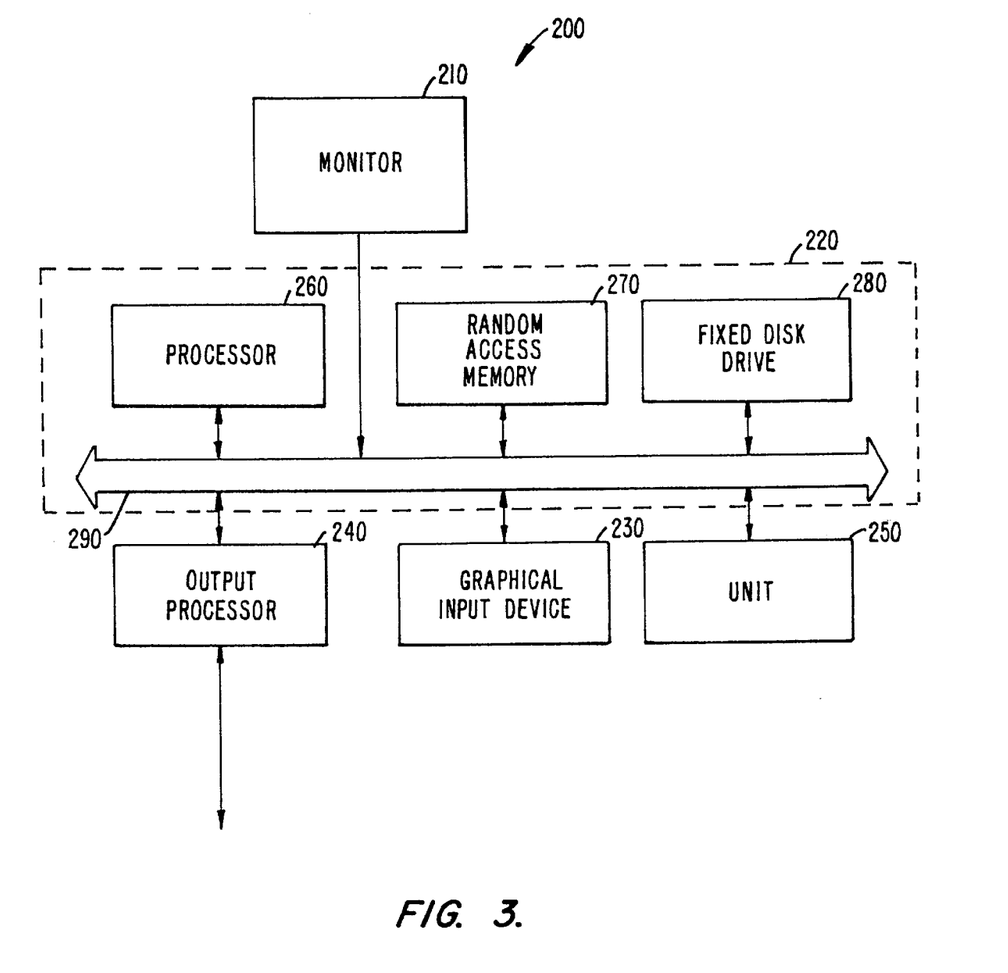
FIG. 3 includes a detailed block diagram of a system 200 according to an embodiment of the present invention.

In an alternative embodiment, FIG. 3 is a simplified block diagram of an audio/video/computer system 200. This diagram is merely an illustration and should not limit the scope of the claims herein. The system 200 includes a monitor 210, a controller 220, a user input device 230, an output processor 240, and a novel electronic storage unit 250 preferably for reading and writing from a removable media source, such as a cartridge. Controller 220 preferably includes familiar controller components such as a processor 260, and memory storage devices, such as a random access memory (RAM) 270, a fixed disk drive 280, and a system bus 290 interconnecting the above components.

User input device 230 may include a mouse, a keyboard, a joystick, a digitizing tablet, a wireless controller, or other graphical input devices, and the like. RAM 270 and fixed disk drive 280 are mere examples of tangible media for storage of computer programs and audio and/or video data, other types of tangible media include floppy disks, optical storage media such as CD-ROMs and bar codes, semiconductor memories such as flash memories, read-only-memories (ROMs), ASICs, battery-backed volatile memories, and the like. In a preferred embodiment, controller 220 includes a '586 class microprocessor running Windows98™ operating system from Microsoft Corporation of Redmond, Wash. Of course, other operating systems can also be used depending upon the application.

The systems above are merely examples of configurations, which can be used to embody the present invention. It will be readily apparent to one of ordinary skill in the art that many system types, configurations, and combinations of the above devices are suitable for use in light of the present disclosure. For example, in alternative embodiments of FIG. 2, for example, video display 10 is coupled to controller 220 thus a separate monitor 210 is not required. Further, user input device 230 also utilizes video display 10 for graphical feedback and selection of options. In yet other embodiments controller 220 is integrated directly into either audio processor 20 or video processor 30, thus separate output processor 240 is not needed. In another embodiment, controller 220 is integrated directly into video display 10. Of course, the types of system elements used depend highly upon the application.

Detailed Description

Figure 4A:
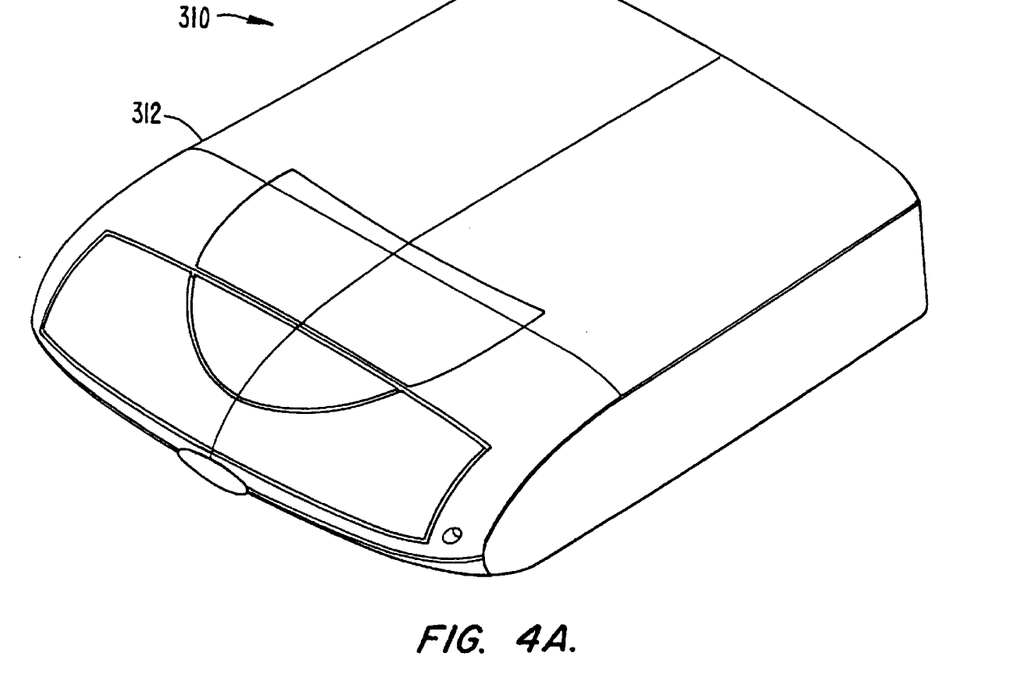
FIGS. 4A and 4B illustrate a storage unit according to an embodiment of the present invention.
Figure 4B:
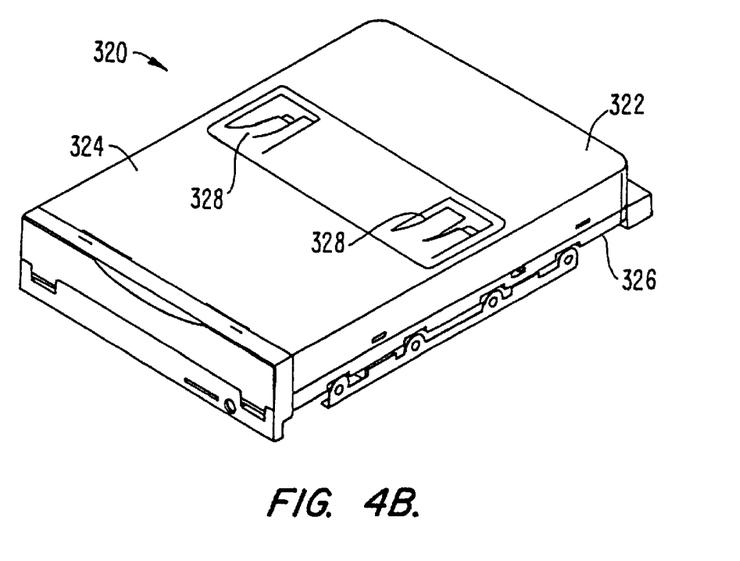

Referring now to FIGS. 4A and 4B, a storage unit according to the present invention can be an external disk drive 310 or internal disk drive 320 unit, which shares many of the same components. However, external drive 310 will include an enclosure 312 adapted for use outside a personal computer, television, or some other data manipulation or display device. Additionally, external drive 310 will include standard I/O connectors, parallel ports, and/or power plugs similar to those of known computer peripheral or video devices.

Internal drive 320 will typically be adapted for insertion into a standard bay of a computer. In some embodiments, internal drive 310 may instead be used within a bay in a television set such as HDTV, thereby providing an integral video system. Internal drive 320 may optionally be adapted for use with a bay having a form factor of 3 inches, 2.5 inches, 1.8 inches, 1 inch, or with any other generally recognized or proprietary bay. Regardless, internal drive 320 will typically have a housing 322 which includes a housing cover 324 and a base plate 326. As illustrated in FIG. 4B, housing 324 will typically include integral springs 328 to bias the cartridge downward within the receiver of housing 322. It should be understood that while external drive 310 may be very different in appearance than internal drive 320, the external drive will preferably make use of base plate 326, cover 324, and most or all mechanical, electromechanical, and electronic components of internal drive 320.

Many of the components of internal drive 320 are visible when cover 322 has been removed, as illustrated in FIG. 5A. In this exemplary embodiment, an actuator 450 having a voice coil motor 430 positions first and second heads 432 along opposed recording surfaces of the hard disk while the disk is spun by spindle drive motor 434. A release linkage 436 is mechanically coupled to voice coil motor 430, so that the voice coil motor effects release of the cartridge from housing 422 when heads 432 move to a release position on a head load ramp 438. Head load ramp 438 is preferably adjustable in height above base plate 426, to facilitate aligning the head load ramp with the rotating disk.

A head retract linkage 440 helps to ensure that heads 432 are retracted from the receptacle and onto head load ramp 438 when the cartridge is removed from housing 422. Head retract linkage 440 may also be used as an inner crash stop to mechanically limit travel of heads 432 toward the hub of the disk.

Base 426 preferably comprise a stainless steel sheet metal structure in which the shape of the base is primarily defined by stamping, the shape ideally being substantially fully defined by the stamping process. Bosses 442 are stamped into base 426 to engage and accurately position lower surfaces of the cartridge housing. To help ensure accurate centering of the cartridge onto spindle drive 434, rails 444 maintain the cartridge above the associated drive spindle until the cartridge is substantially aligned axially above the spindle drive, whereupon the cartridge descends under the influence of cover springs 428 and the downward force imparted by the user. This brings the hub of the disk down substantially normal to the disk into engagement with spindle drive 434. A latch 446 of release linkage 436 engages a detent of the cartridge to restrain the cartridge, and to maintain the orientation of the cartridge within housing 422.

A cartridge for use with internal drive 320 is illustrated in FIGS. 5B and 5C. Generally, cartridge 460 includes a front edge 462 and rear edge 464. A disk 666 (see FIG. 5F) is disposed within cartridge 460, and access to the disk is provided through a door 568. A detent 470 along rear edge 464 of cartridge 460 mates with latch 446 to restrain the cartridge within the receptacle of the drive, while rear side indentations 472 are sized to accommodate side rails 444 to allow cartridge 460 to drop vertically into the receptacle.

Figure 5D:
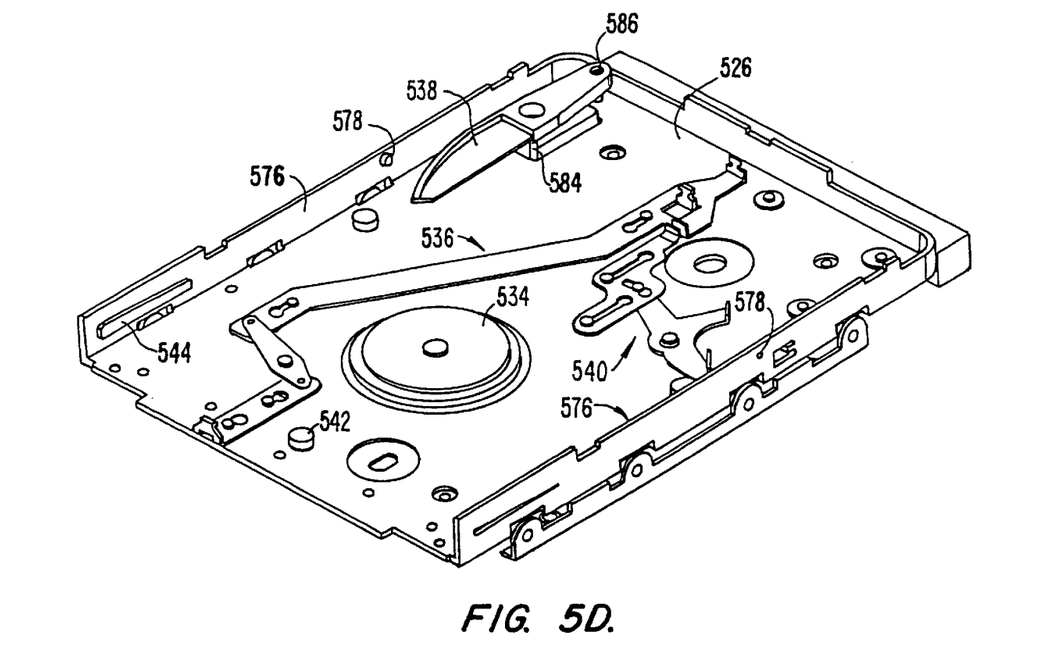
Figure 5E:
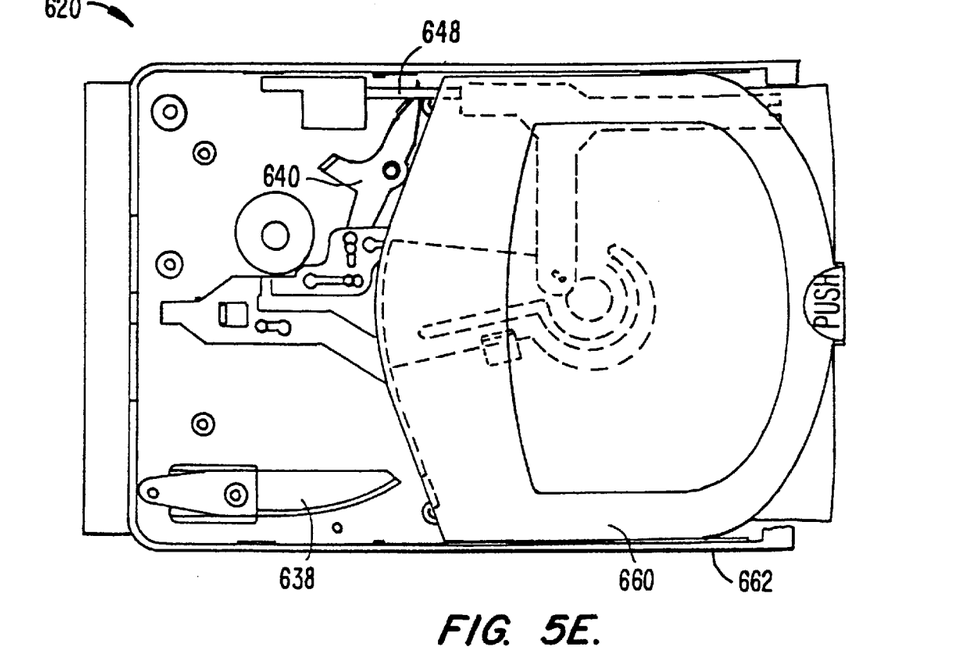

Side edges 574 of cartridge 460 are fittingly received between side walls 576 of base 526, as illustrated in FIG. 5D. This generally helps maintain the lateral position of cartridge 460 within base 426 throughout the insertion process. Stops 578 in sidewall 576 stop forward motion of the cartridge once the hub of disk 666 is aligned with spindle drive 534, at which point rails 444 are also aligned with rear indents 472. Hence, the cartridge drops roughly vertically from that position, which helps accurately mate the hub of the disk with the spindle drive.

Figure 5F:
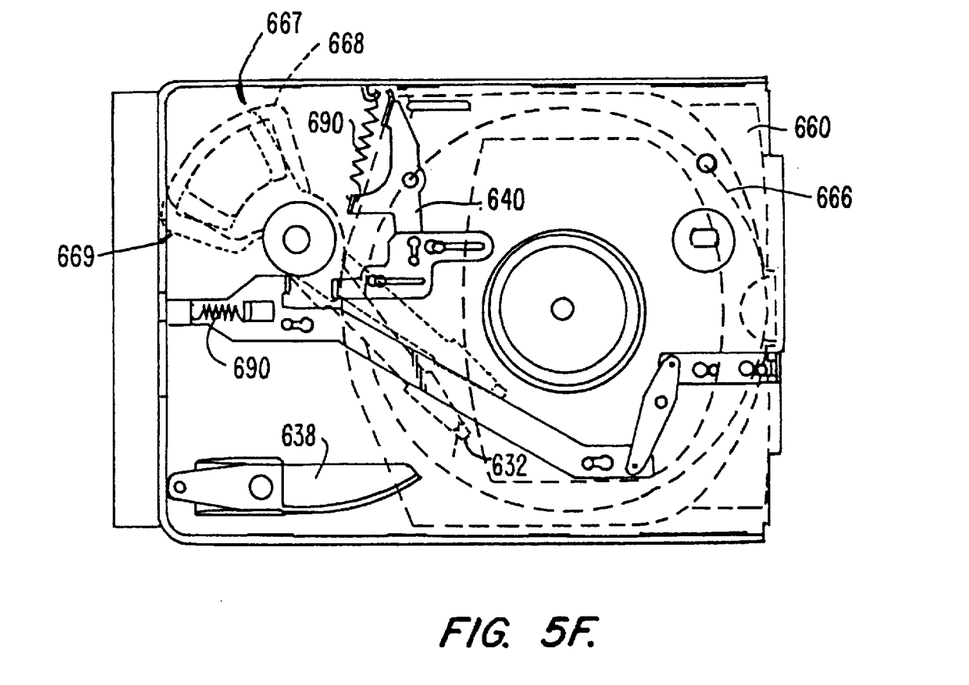

FIG. 5F also illustrates a typical first position 667 of VCM 668 and a typical second position 669 in response to different magnetic fluxes from a motor driver. As a result, read/write heads 632 are repositioned relative to disk 666 as shown.

Figure 6:
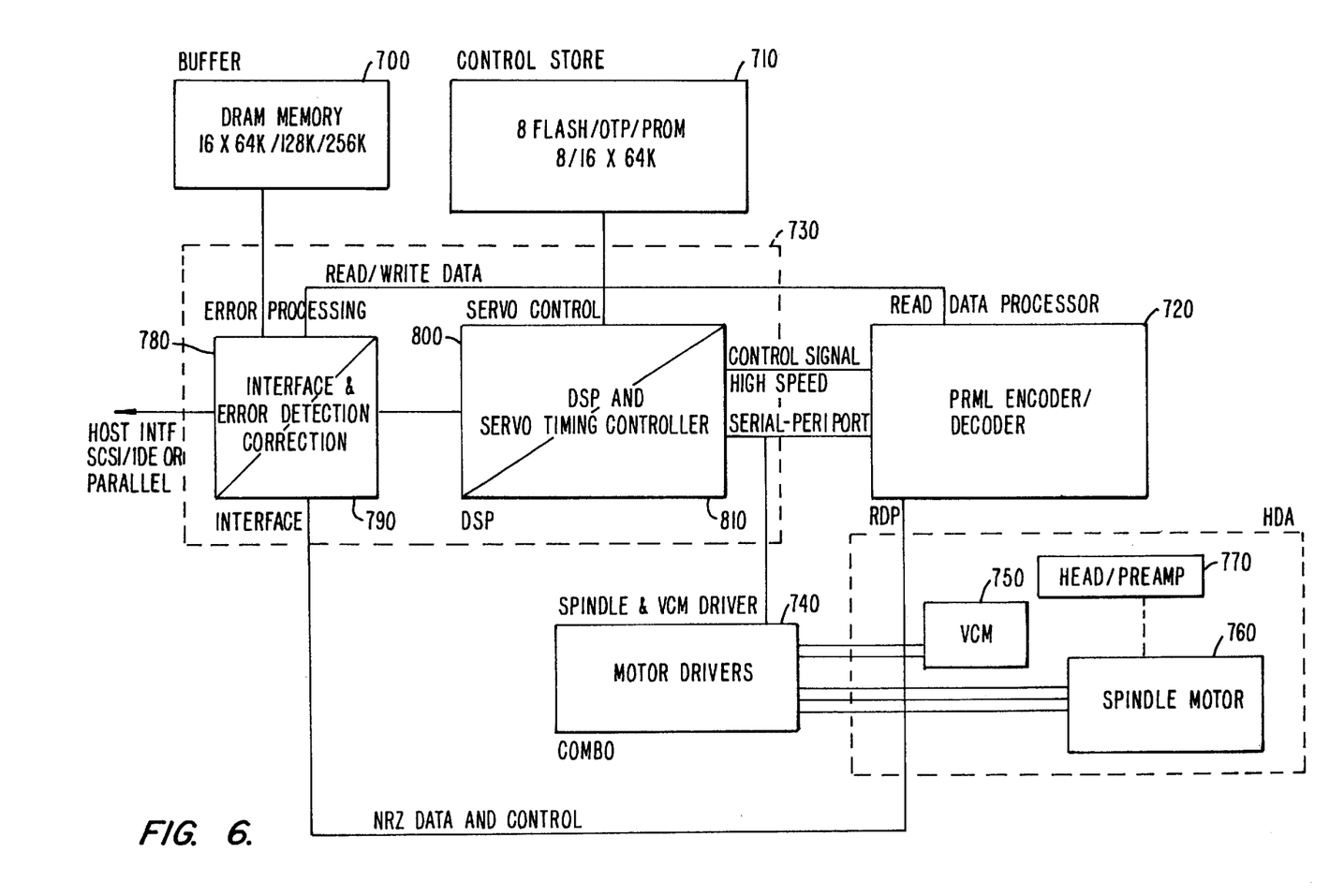
FIG. 6 illustrates a functional block diagram of an embodiment of the present invention.

FIG. 6 illustrates a simplified functional block diagram of an embodiment of the present invention. FIG. 6 includes a buffer 700, a control store 710, a read data processor 720, a controller 730, motor drivers 740, a voice coil motor 750, a spindle motor 760, and read/write heads 770. Controller 730 includes interface module 780, an error detection and correction module 790, a digital signal processor 800, and a servo timing controller 810. Voice coil motor 750 preferably corresponds to voice coil motor 430 in FIG. 5A, spindle motor 760 preferably corresponds to spindle drive motor 434 in FIG. 5A, and read/write heads 770 preferably correspond to read/write heads 432 on actuator arm 450 in FIG. 5A.

As illustrated in FIG. 6, buffer 700 typically comprises a conventional DRAM, having 16 bits×64K, 128K, or 256K, although other sized buffers are also envisioned. Buffer 700 is typically coupled to error detection and correction module 790. Buffer 700 preferably serves as a storage of data related to a specific removable media cartridge. For example, buffer 700 preferably stores data retrieved from a specific removable media cartridge (typically a magnetic disk), such as media composition and storage characteristics, the location of corrupted locations, the data sector eccentricity of the media, the non-uniformity of the media, the read and write head offset angles for different data sectors of the media and the like. Buffer 700 also preferably stores data necessary to compensate for the specific characteristics of each removable media cartridge, as described above. Buffer 700 typically is embodied as a 1 Meg DRAM from Sanyo, although other vendors' DRAMs may also be used. Other memory types such as SRAM and flash RAM are contemplated in alternative embodiments. Further, other sizes of memory are also contemplated.

Control store 710 typically comprises a readable memory such as a flash RAM, EEPROM, or other types of nonvolatile programmable memory. As illustrated, typically control store 710 comprises a 8 to 16 bit×64K memory array, preferably a flash RAM by Atmel. Control store 710 is coupled to DSP 800 and servo timing controller 810, and typically serves to store programs and other instructions for DSP 800 and servo timing controller 810. Preferably, control store 710 stores access information that enables retrial of the above information from the media and calibration data.

Read data processor 720 typically comprises a Partial Read/Maximum Likelihood (PRML) encoder/ decoder. PRML read channel technology is well known, and read data processor 720 is typically embodied as a 81M3010 chip from MARVELL company. Other read data processors, for example from Lucent Technologies are contemplated in alternative embodiments of the present invention. As illustrated, read data processor 720 is coupled to error detection and correction module 790 to provide ECC and data transport functionality.

Interface module 780 typically provides an interface to controller 220, for example. Interfaces include a small computer standard interface (SCSI), an IDE interface, parallel interface, PCI interface or any other known or custom interface. Interface module 780 is typically embodied as an AK-8381 chip from Adaptec, Inc. Interface module 780 is coupled to error detection and correction module 790 for transferring data to and from the host system.

Error detection and correction module 790 is typically embodied as a AIC-8381B chip from Adaptec, Incorporated. This module is coupled by a read/write data line to read data processor 720 for receiving read data and for ECC. This module is also coupled to read data processor 720 by a now return to zero (NRZ) data and control now return to zero line. Other vendor sources of such functionality are contemplated in alternative embodiments of the present invention.

DSP 800 typically provides high-level control of the other modules in FIG. 6. DSP 800 is typically embodied as a AIC-4421A DSP from Adaptec, Inc. As shown, DSP 800 is coupled to read data processor 720 to provide control signals for decoding signals read from a magnetic disk. Further, DSP 800 is coupled to servo timing controller 810 for controlling VCM 750 and spindle motor 760. Other digital signal processors can be used in alternative embodiments, such as DSPs from TI or Motorola.

Servo timing controller 810 is typically coupled by a serial peripheral port to read data processor 720 and to motor drivers 740. Servo timing controller 810 typically controls motor drivers 740 according to servo timing data read from the removable media. Servo timing controller 810 is typically embodied in a portion of DSP800.

Motor driver 740 is typically embodied as a L6260L Chip from SGS-Thomson. Motor driver 740 provides signals to voice coil motor 750 and to spindle motor 760 in order to control the reading and writing of data to the removable media.

Spindle motor 760 is typically embodied as an 8 pole Motor from Sankyo Company. Spindle motor 760 typically is coupled to a center hub of the removable media as illustrated in FIG. 4 and rotates the removable media typically at rates from 4500 to 7200 revolutions per minute. Other manufacturers of spindle motor 760 and other rates of revolution are included in alternative embodiments.

VCM 750 is a conventionally formed voice coil motor. Typically VCM 750 includes a pair of parallel permanent magnets, providing a constant magnetic flux. VCM 750 also includes an actuator having a voice coil, and read/write heads. Read/ write heads are typically positioned near the end of the actuator arm, as illustrated in FIG. 5A. The voice coil is typically electrically coupled to motor driver 740. VCM 750 is positioned relative to the magnetic disk in response to the amount of magnetic flux flowing through the voice coil. FIG. 5F illustrates a typical first position 667 of VCM 668 and a typical second position 669 in response to different magnetic fluxes from motor driver 740. As a result, read/write heads 632 are repositioned relative to disk 666 as shown.

In a preferred embodiment of the present invention read/ write heads are separate heads that utilize magneto resistive technology. In particular, the MR read/write heads. Typically a preamplifier circuit is coupled to the read/write heads.

In the preferred embodiment of the present embodiment the removable media cartridge is comprises as a removable magnetic disk. When reading or writing data upon the magnetic disk the read/write heads on the end of the actuator arm "fly" above the surface of the magnetic disk. Specifically, because the magnetic disk rotates at a high rate of speed, typically 5400 rpm, a negative pressure pulls the read/write heads towards the magnetic disk, until the read/ write heads are typically 0.001 millimeters above the magnetic disk. At 2000 rpm, the negative pressure on the read/write heads drops to approximately half the force as at 5400 rpm.

The preferred embodiment of the present invention includes a "header less ID" or "No-ID" scheme for accessing data on magnetic disks. One embodiment of a conventional technique is found in the following article "No-ID Sector Format" found at the following web site: http:// www.almaden.ibm.com/storage/oem/tch/noid.htm as of the filing date of this patent. This article is incorporated by reference for all purposes.

Figure 7:
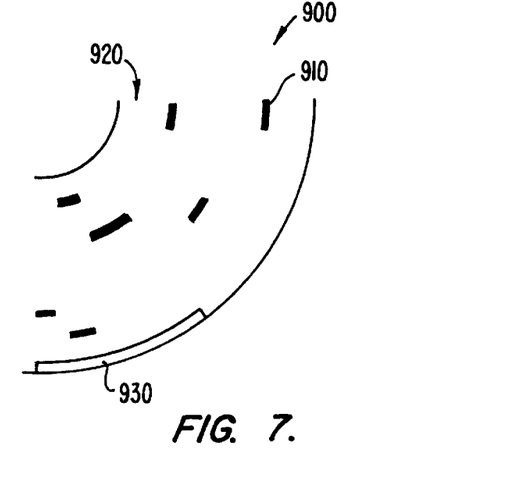
FIG. 7 illustrates a preferred embodiment of the present invention.

FIG. 7 illustrates a preferred embodiment of the present invention;. FIG. 7 includes a portion of an exemplary magnetic disk 900 having a plurality of defective locations 910, locations 920 where data may be stored, and a encrypted defect map 930.

In the preferred embodiment, encrypted defect map 930 is stored in a predetermined portion of the magnetic disk 900. Encrypted defect map 930 preferably identifies plurality of defective locations 910 in an encrypted form. In alternative embodiments, non-defective locations can also be stored within encrypted defect map 930. Locations 920, non-defective portions of magnetic disk 900, are typically used to store data.

Figure 8:
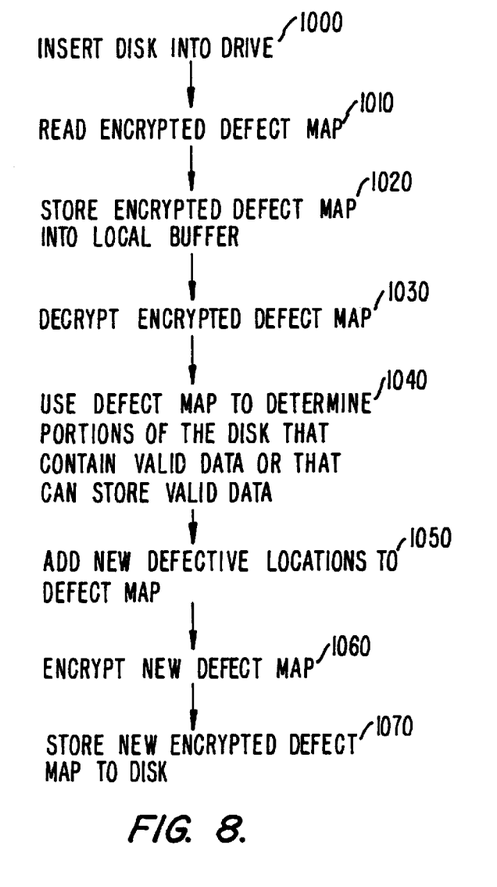
FIG. 8 illustrates a flow diagram of an embodiment of the present invention.

FIG. 8 illustrates a flow diagram of an embodiment of the present invention.

Initially a user inserts a magnetic disk, as described in FIG. 7 into a removable drive unit, step 1000. Preferably, the encrypted defect map from the magnetic disk is read by MR heads 770, step 1010. The encrypted defect map is then stored into buffer 700, step 1020. The encrypted defect map may also include a check-sum number to further indicate data integrity.

Preferably, DSP 800 then decrypts the encrypted defect map, using a predetermined decryption scheme and forms a defect map identifying the plurality of defective locations, step 1030. Preferably the encryption scheme is self-contained within the removable drive unit, thus, the removable drive unit will automatically decrypt defect maps from magnetic disks, upon insertion and use the decrypted defect map.

Preferably the encryption scheme employs a 32 bit "two-way" encryption scheme such that A->encryption ->A' and A'->encryption ->A. In this embodiment, encryption and decryption are performed in the same way for sake of simplicity and economy of resources. In alternative embodiments, one-way encryption schemes can also be used, for example, A->encryption1->B and B->encryption2->A.

DSP 800 then preferably uses the defect map to provide access to locations on the disk other than at the defective locations, step 1040. Because virtually no two magnetic disks are ever alike, the location of defects on a magnetic disk and the defect maps are unique. If an unauthorized duplicate is used of an original magnetic disk that has a first defect map stored as a first encrypted defect map, DSP 800 will decrypt the first encrypted defect map and uses the first defect map as a guide to the authorized duplicate. However, since the first encrypted defect map and the first defect map are only valid for the original disk, data locations that should be valid may be indicated as defective and data locations that should be invalid may be indicated as not defective. Thus, in such an embodiment, use of the unauthorized duplicate would be greatly inhibited, because of the loss of data and the incorporation of defective areas as valid data locations.

When new defective locations are determined on the disk, DSP 800 preferably adds the new defective locations to the existing defective map, step 1050. This updated defect map is then preferably encrypted by DSP 800, step 1060, and the updated encrypted defect map is then stored onto the magnetic disk, step 1070.

Encryption described above may utilize any known encryption scheme. For example, public key encryption, and the like.

In alternative embodiments of the present invention, data other than a defect map may be encrypted. For example, calibration data as described in co-pending application (Attorney docket no. 18525-001400), on a magnetic disk may be encrypted. Thus, if the calibration data are not readily determinable by the removable drive unit, the performance and reliability of the combination of removable drive unit and the magnetic disk are lessened. Other data that may be encrypted and stored on the magnetic disk include the data zone table, the disk layout (zone bit boundaries), and the like.

In an alternative embodiment of the present invention, less than all the defective locations are stored in encrypted form to enhance processing time. In such an embodiment, some defective locations are encrypted and some are not. In use, once the encrypted defect map is decrypted, the entire defect map can be formed.

In other embodiments, portions of the disk other than defective locations may be added to the defect map. For example, the user could deliberately add "defective" regions to the magnetic disk to further inhibit duplication of the magnetic disk, i.e. regions that are not truly defective. As a result, an unauthorized user who determines where the magnetic disk is defective could still not properly access the data because of the inclusion of the deliberate "defective" regions. As a further refinement of this embodiment, DSP 800 could be preprogrammed to look for a certain predefined pattern of deliberate "defective" regions in the decrypted defect map. If that predefined pattern is not present, the removable drive unit preferably rejects the disk.

Conclusion

In the foregoing specification, the invention has been described with reference to specific exemplary embodiments thereof. Many changes or modifications are readily envisioned. Further modifications include in combination with the above encrypting the actual data through the same encryption scheme.

The presently claimed inventions may also be applied to other areas of technology such as mass storage systems for storage of video data, audio data, textual data, program data, or any computer readable data in any reproducible format.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for accessing a headerless-ID magnetic disk comprising:

inserting the headerless-ID magnetic disk into a removable drive unit, the headerless-ID magnetic disk having a plurality of defective locations and an encrypted defect map, wherein the defect map also comprises a plurality of non-defective locations;

retrieving the encrypted defect map from the magnetic disk;

storing the encrypted defect map into a memory in the removable drive unit;

decrypting the encrypted defect map to form a defect map comprising the plurality of defective locations on the headerless-ID magnetic disk;

comparing the plurality of non-defective locations to a predetermined plurality of non-defective locations;

authenticating the header-less ID magnetic disk in response to comparing the plurality of non-defective locations; and using the defect map to provide access to locations on the headerless-ID magnetic disk other than locations stored within the defect map.

2. The method of claim 1 further comprising:

determining a new defective location on the headerless-ID magnetic disk; and adding the new defective location to the defect map to form a revised defect map.

3. The method of claim 2 further comprising:

encrypting the revised defect map to form a revised encrypted defect map; and storing the revised encrypted defect map on the headerless-ID magnetic disk.

4. A method for authenticating a removable cartridge having a magnetic disk including a first plurality of defective locations, the method comprising:

inserting the removable cartridge into a storage unit;

retrieving an encrypted defect map and an unencrypted defect map from the magnetic disk, the unencrypted defect map including a first plurality of locations on the magnetic disk;

storing the encrypted defect map and the unencrypted defect map into a memory in the storage unit;

decrypting the encrypted defect map to form a second plurality of locations on the magnetic disk;

using the first plurality of locations and the second plurality of locations together as a defect map having a third plurality of locations for the magnetic disk; and authenticating the magnetic disk by testing at least one location of the third plurality of locations on the magnetic disk.

5. The method of claim 4 wherein the second plurality of locations comprise a plurality of defective locations and a plurality of non-defective locations.

6. The method of claim 5 wherein authenticating the magnetic disk further comprises authenticating the magnetic disk by testing at least one non-defective location of the plurality of non-defective location on the magnetic disk.

7. The method of claim 4 wherein the unencrypted defect map is compressed.

8. A removable magnetic cartridge having a magnetic disk comprising:

a plurality of defective locations; and an encrypted defect map comprising a defect map identifying the plurality of locations on the removable magnetic disk in an encrypted form, wherein the magnetic disk also includes an encrypted data zone map comprising a data zone map identifying locations of data zones on the removable magnetic disk in an encrypted form.

9. The removable magnetic cartridge of claim 8 wherein the plurality of locations includes a plurality of non-defective locations on the removable magnetic disk.

10. The removable magnetic cartridge of claim 9 wherein the plurality of locations also includes a plurality of defective locations on the removable magnetic disk.

11. The removable magnetic cartridge of claim 8 wherein the magnetic disk also includes an encrypted calibration track comprising a calibration track identifying calibration information for a data zones on the removable magnetic disk in an encrypted form.

12. The removable magnetic cartridge of claim 8 wherein the magnetic disk also includes an encrypted zone bit map comprising a zone bit map identifying boundaries of zone bits on the removable magnetic disk in an encrypted form.

13. A computer system having a removable drive unit, the removable drive unit comprising:

a sensor for sensing data including output data and encrypted map data from a magnetic disk inserted into the removable drive unit, a memory coupled to the sensor for storing the encrypted map data; and a processor coupled to the sensor and to the memory for decrypting the encrypted map data to form a defect map for the magnetic disk, the defect map comprising a plurality of locations on the magnetic disk, and for verifying at least one of the plurality of locations is non-defective.

14. The computer system of claim 13 wherein the sensor is also for writing of data to locations on the magnetic disk other than to locations of the plurality of locations on the magnetic disk.

15. The computer system of claim 13 wherein the processor is also for verifying at least one of the plurality of locations is defective.

16. A computer program product for a removable disk drive unit having a processor comprises:

code that directs the processor to retrieve an encrypted defect map from a magnetic disk;

code that directs the processor to decrypt the encrypted defect map to recover a plurality of disk locations on the magnetic disk;

code that directs the processor to provide access to disk locations on the magnetic disk other than disk locations from the plurality of disk locations, wherein the plurality of disk locations comprises a plurality of non-defective disk locations; and code that directs the processor to authenticate the magnetic disk comprising code that directs the processor to compare the plurality of non-defective disk locations to a predetermined plurality of non-defective disk locations, wherein the codes reside on a tangible media.

17. The computer program product of claim 16 further comprising:

code that directs the processor to determine a new disk location on the magnetic disk; and code that directs the processor to add the new disk location to the plurality of disk locations to form a revised plurality of disk locations.

18. The computer program product of claim 17 further comprising:

code that directs the processor to encrypt the revised plurality of disk locations to form a revised encrypted defect map; and code that directs the processor to store the revised encrypted defect map on the magnetic disk.

\* \* \* \* \*